United States Patent [19]

Elle et al.

[11] 4,067,228
[45] Jan. 10, 1978

[54] PIPE TESTING APPARATUS

[75] Inventors: Ralph C. Elle; Jerry L. Walker, both of Portland, Oreg.

[73] Assignee: Northwest Pipe & Casing Co., Clackamas, Oreg.

[21] Appl. No.: 748,688

[22] Filed: Dec. 9, 1976

[51] Int. Cl.² .............................................. G01M 3/28
[52] U.S. Cl. ..................................... 73/49.1; 73/49.5
[58] Field of Search ...................... 73/49.1, 49.5, 49.6

[56] References Cited
FOREIGN PATENT DOCUMENTS 845,719  8/1952  Germany .............................. 73/49.1

*Primary Examiner*—Donald O. Woodiel
*Attorney, Agent, or Firm*—Kolisch, Hartwell, Dickinson & Stuart

[57] ABSTRACT

Apparatus for testing a pipe under internal fluid pressure for leakage or structural integrity includes an elongate, hollow mandrel having one end sealed by a fixed seal. A shiftable seal is adapted to advance a pipe to be tested so that the other end of the mandrel is inserted through one end of the pipe to a testing position. The shiftable seal includes a pressure plate and a plug, the pressure plate sealing the other end of the pipe and the plug insertable within the other end of the mandrel for sealing it when the mandrel is in the testing position. The shiftable seal further includes a frame assembly movable along tension beam members, the assembly being selectively lockable thereto. The pressure plate is mounted on the assembly and is adapted to be selectively extended from or retracted toward the assembly.

17 Claims, 10 Drawing Figures

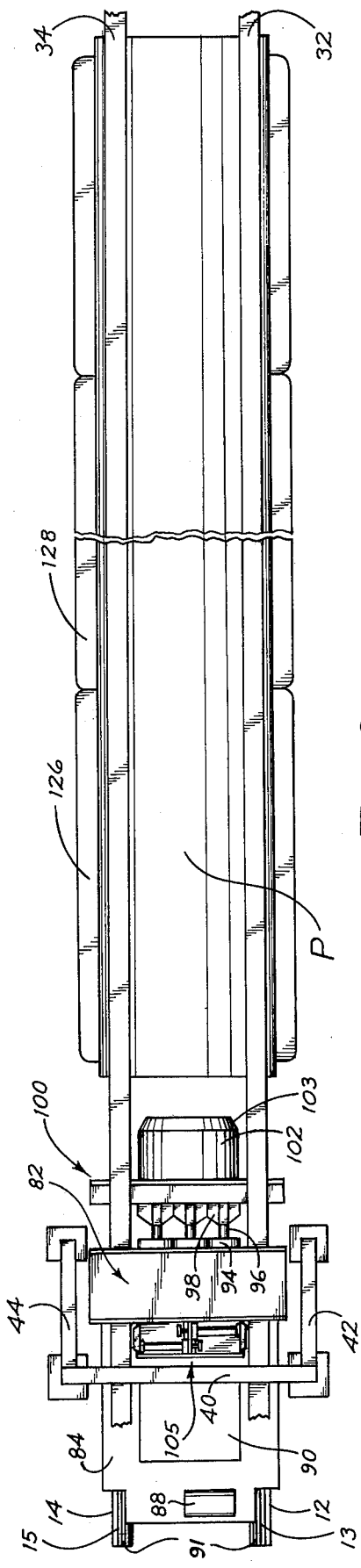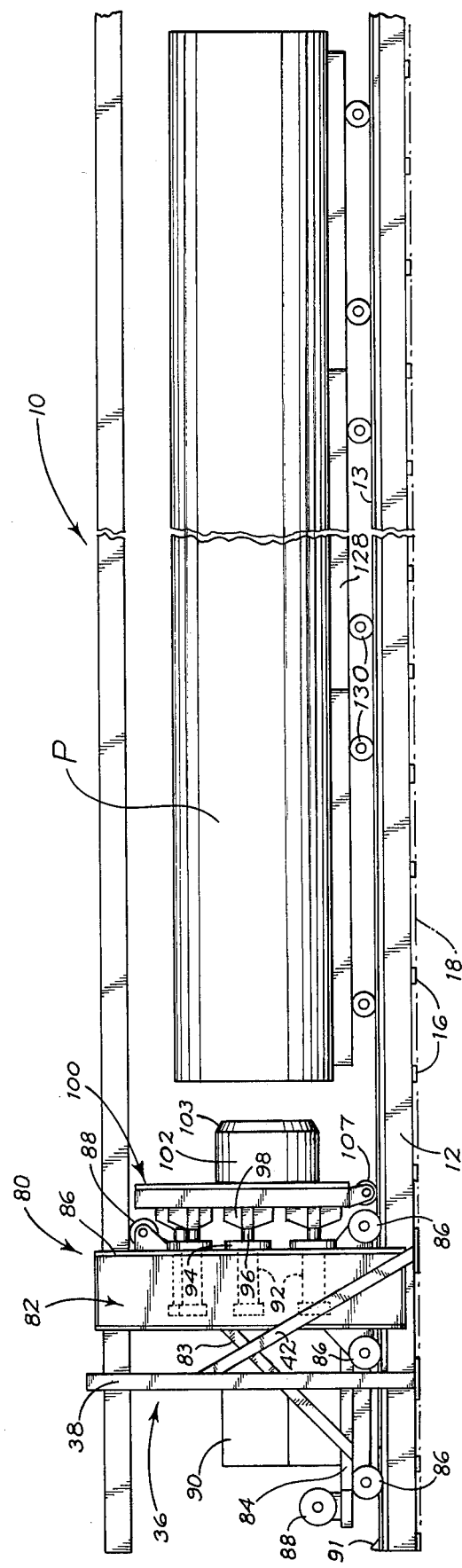

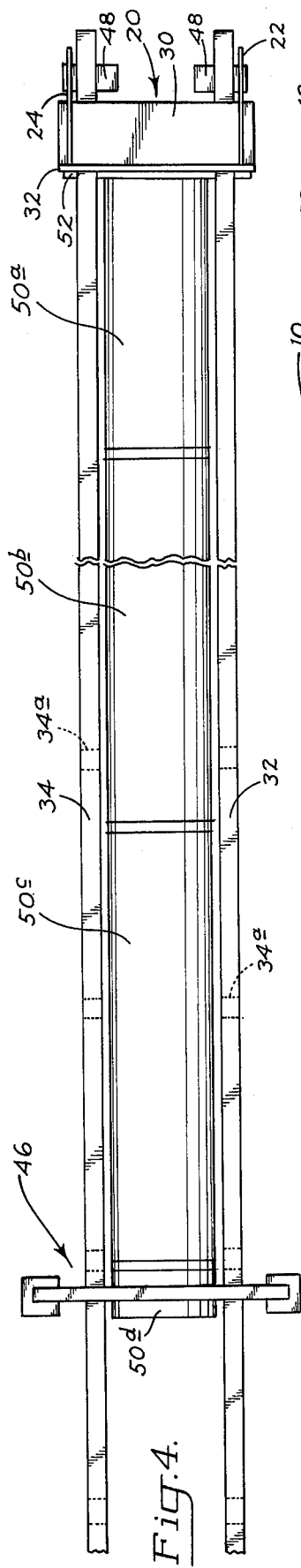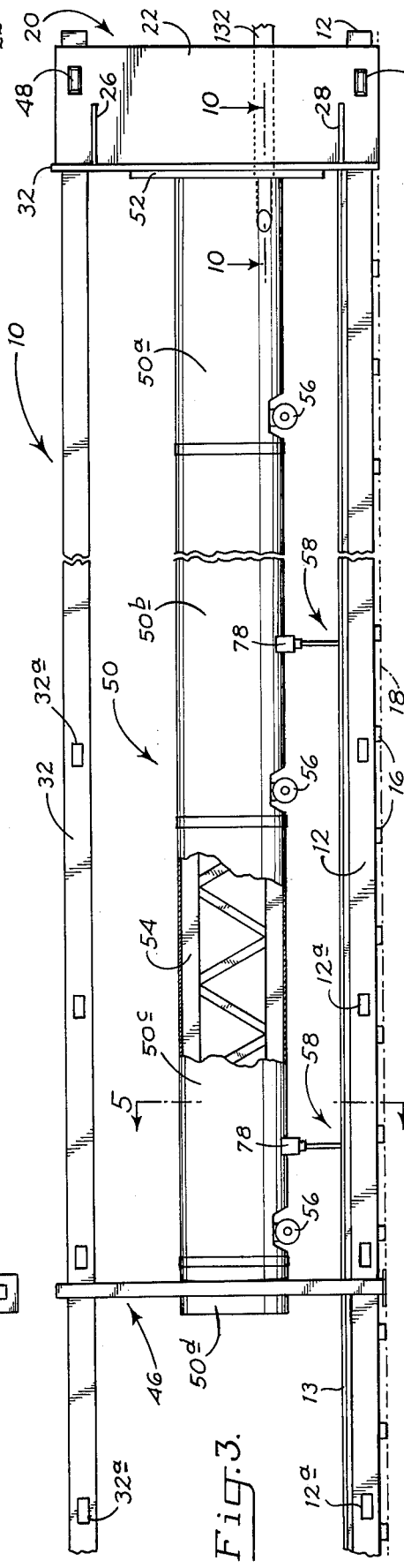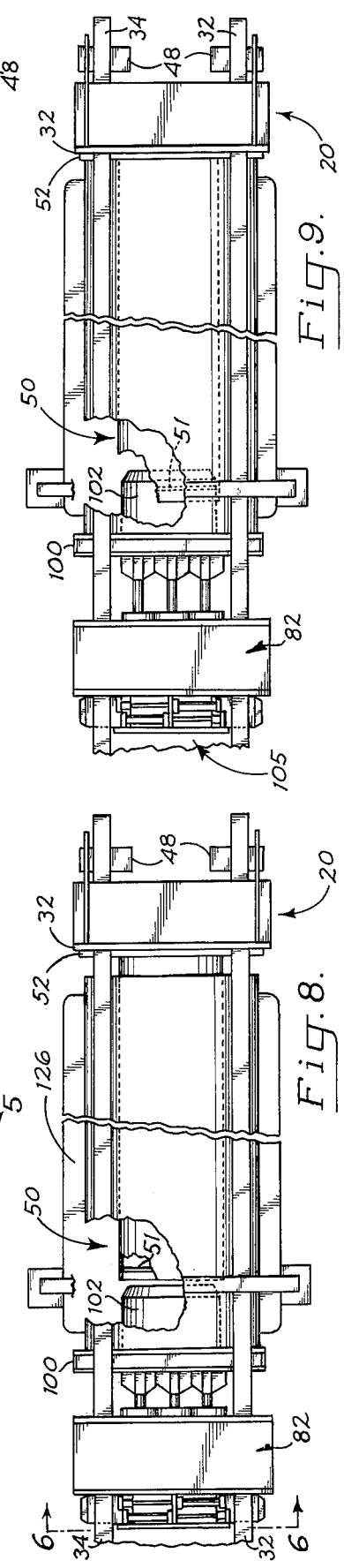

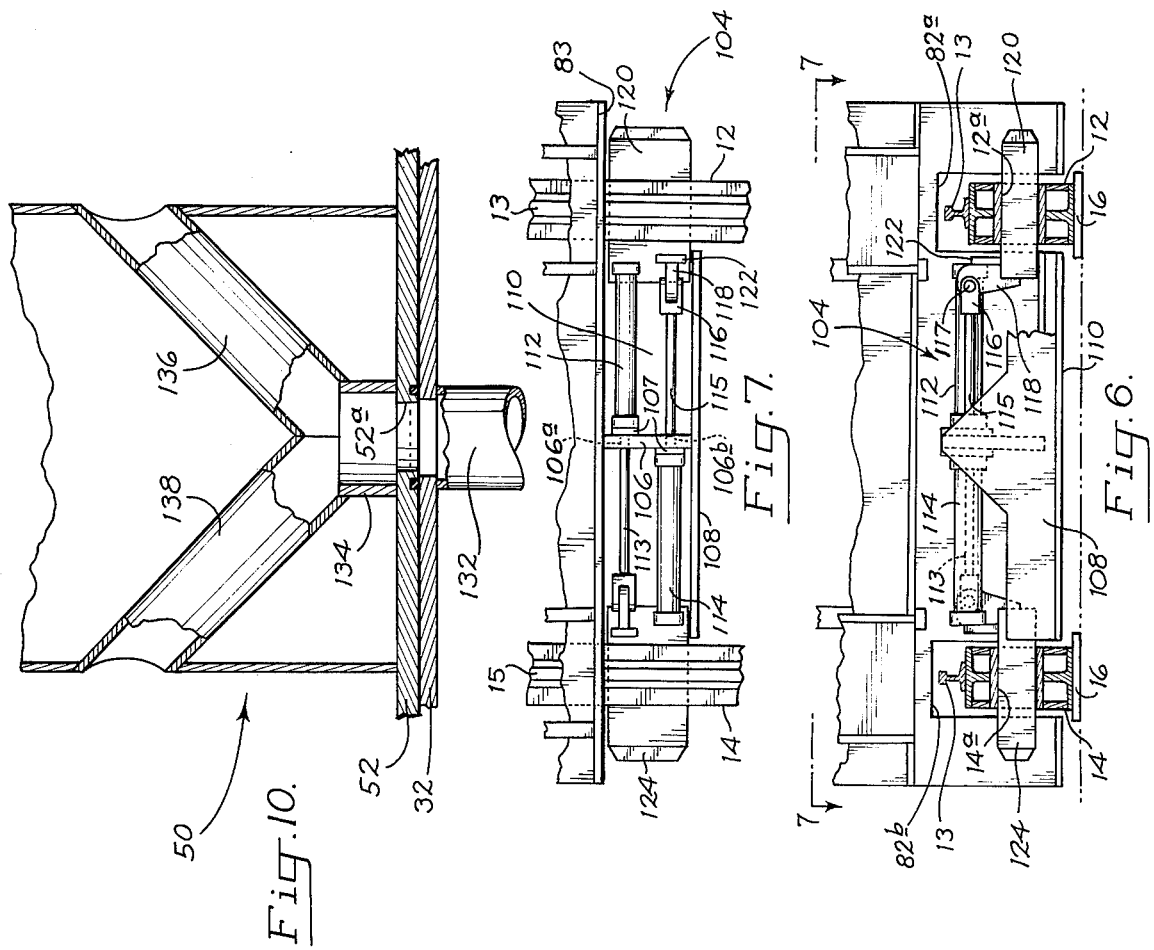
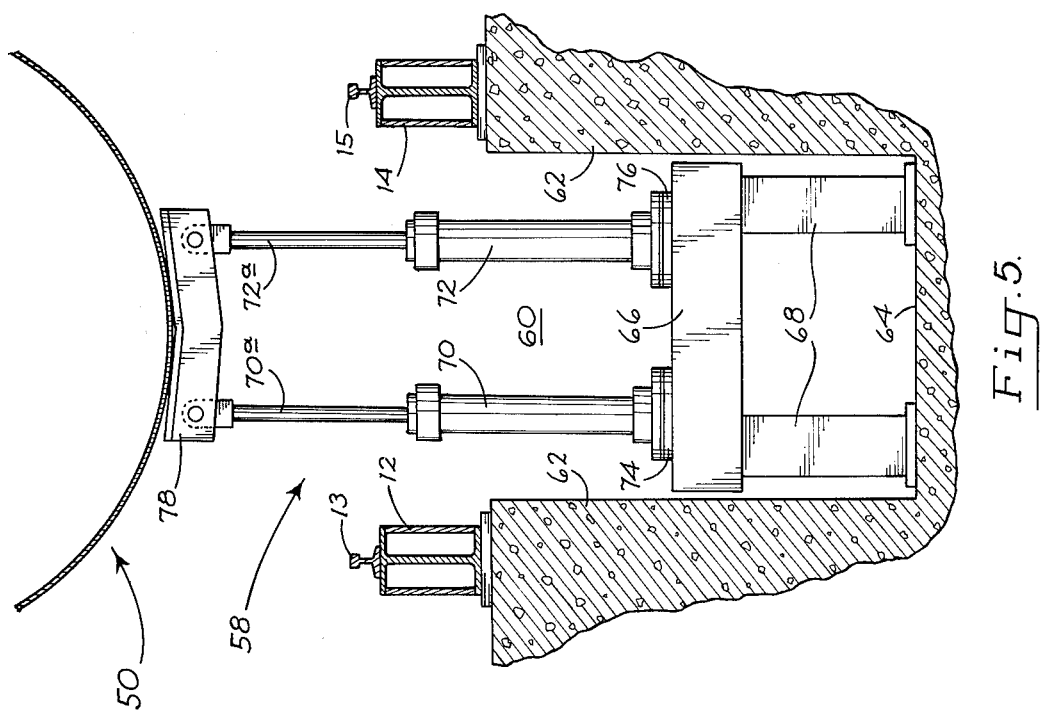

PIPE TESTING APPARATUS

BACKGROUND AND SUMMARY OF THE INVENTION

The present invention relates to pipe testing apparatus, and more particularly to improved apparatus for providing fluid pressure within a pipe to test for leakage, structural integrity, etc.

It is known to pressure-test pipes by introducing fluid under pressure into a pipe having sealed ends. However, if a pipe is of relatively large diameter and long length, considerable fluid pressure will develop against plates or caps which seal the ends of the pipe. Additionally, it is costly and time consuming to provide a large volume of fluid within the pipe. To overcome these problems, there have been proposals to insert a mandrel within a pipe to be tested.

With a mandrel inserted in a pipe, fluid may be introduced between the outer surface of the mandrel and the inner diameter of the pipe. Less fluid is required because of the volume occupied by the mandrel, and pressures exerted on caps covering the end of the pipe will be correspondingly decreased. Also, the time required to introduce and withdraw a fluid, such as water, will be decreased.

There are, however, certain deficiencies present in prior art systems which employ a mandrel within a pipe for testing. First of all, the mandrel must be provided with seals at both of its ends in order to produce a fluid-sealed condition between the ends of the mandrel and the ends of the pipe. Such a mandrel is adequate for testing only a given pipe length. If a long pipe is to be tested, the mandrel must be moved in stages throughout the length of a pipe with testing being done at each individual stage. This procedure is time consuming and expensive.

Additionally, difficulties arise when the mandrel is to be used in testing pipes having different sized diameters. Prior art devices attempt to solve this problem by providing complex expandable and contractable sealing mechanisms.

Accordingly, it is a general object of the present invention to provide a pipe-testing apparatus which is readily adapted to test the entire length of pipes of varying diameters and lengths, including relatively long lengths and large diameters.

More particularly, the present invention provides an apparatus which includes a first, fixed sealing means for sealing one end of a mandrel. A second, shiftable sealing means is adapted to advance a pipe so that the non-sealed mandrel end is inserted through one end of the pipe to a testing position. The shiftable sealing means urges the other end of the pipe against the first sealing means. The shiftable sealing means includes a pressure plate and a plug, the pressure plate sealing one end of the pipe and the plug being insertable within the open end of the mandrel for sealing it. In the testing position, both ends of the mandrel and pipe are sealed. The pressure plate is sized to seal pipes of varying diameters, and the mandrel may include detachable sections to accommodate different lengths of pipe.

Another object of the present invention is to provide a relatively simple pipe-testing apparatus in which the fixed sealing means is secured to tension beam members, and wherein the shiftable sealing means is selectively lockable to the tension beam members at selected locations therealong.

These and other various objects and advantages of the present invention will become more fully apparent as the following description is read in conjunction with the accompanying drawings.

BRIEF DESCRIPTION OF THE DRAWINGS

FIG. 1 is a side elevation view, broken along its length, of the left-hand portion (to be viewed in conjunction with FIG. 3) of a pipe testing apparatus according to the present invention showing a shiftable seal mounted on tension beam members, the seal being shown to the left of a pipe to be tested;

FIG. 2 is a top plan view of the apparatus shown in FIG. 1;

FIG. 3 is a side elevation view, broken along its length, of the right-hand portion of the apparatus showing an elongate mandrel supported along its length and sealed at one end thereof by a fixed seal;

FIG. 4 is a top plan view of the portion shown in FIG. 3;

FIG. 5 is a view taken along lines 5—5 of FIG. 3 and illustrates details of an extendible-retractable mechanism used to support the mandrel;

FIG. 6 is a view, taken along lines 6—6 of FIG. 8 illustrating details of a locking mechanism used to lock the shiftable seal to the tension beam members;

FIG. 7 is a top plan view of the locking mechanism of FIG. 6;

FIG. 8 is a top plan view of the pipe-testing apparatus, greatly shortened along its length, illustrating the positioning of a pipe over the mandrel just prior to being situated in a testing position;

FIG. 9 is a view similar to FIG. 8 except that the shiftable seal has been adjusted to seal both ends of the pipe and to also seal the open end of the mandrel; and FIG. 10 is a view along lines 10—10 of FIG. 3 and illustrates a piping arrangement extending through the mandrel for introducing fluid between the outer periphery of the mandrel and the inner diameter of a pipe when the mandrel and pipe are disposed in a testing position.

DETAILED DESCRIPTION OF THE INVENTION

Turning now to the drawings, and referring initially to FIGS. 1-4, a pipe-testing apparatus according to the present invention is generally designated at 10. In order to properly view the pipe-testing apparatus 10, it is necessary to visualize that FIG. 3 is an extension to the right of FIG. 1, and that FIG. 4 is an extension to the right of FIG. 2.

Laterally opposed elongate tension beam members 12, 14 are mounted on top of a plurality of spaced-apart support pads 16 on a floor surface 18. Pads 16 are appropriately secured to floor 18. Considering FIGS. 3 and 4, at the right-hand side of apparatus 10 is fixed frame assembly generally designated at 20. Assembly 20 is constructed with upright side plates 22, 24 which are interconnected by laterally extending plates 26, 28 and 30. A plate 32 is provided at the front of assembly 20.

Assembly 20 is rigidly mounted on beam members 12, 14. Beam members 12, 14 extend through channels (not shown) in assembly 20. Further, at an upper portion of assembly 20 there are provided additional channels (not shown) so that upper tension beam members 32, 34 may extend therethrough. Assembly 20 supports the right-hand end of tension beams 32, 34 and the left-hand end is supported by a support structure generally designated at 36. Structure 36 includes a pair of floor-mounted uprights, one of which is shown at 38, interconnected by a cross member 40. Beam members 32, 34 are supported by cross member 40. Mounted to floor 18 and extending upwardly are diagonal braces 42, 44 connected to an associated upright of support structure 36. Thus, it can be appreciated that frame assembly 20 supports one end of tension beams 32, 34 while frame 36 supports the other end. While only one intermediate support structure is shown at 46, it must be appreciated that other such intermediate structures could be provided as required.

Tension beam members 12, 14, 32, 34 are provided along their lengths with a plurality of spaced-apart slots. The slots are designated at 12a, 14a, 32a, 34a. Also, slots are provided at the right-hand end of the beam members so that locking keys 48 may be inserted through such slots and cooperating slots in side plates 22, 24 to thereby lock and fix assembly 20 to the beam members.

An elongate, hollow mandrel, generally designated at 50, is provided with a first sealing means such as a plate 52 secured at one end thereof. Plate 52 is disposed adjacent to plate 32 on assembly 20 as shown in FIGS. 3 and 4. Mandrel 50 is shown as being constructed of interconnected mandrel sections 50a, 50b and 50c. A smaller section 50d is provided at the left-hand end of mandrel 50. Each of the sections is detachably connected to an adjacent section so that the mandrel length may be selectively increased or decreased. Each section also includes a supporting framework or truss such as truss 54. Further, each of the mandrel sections is provided with roller means on the bottom of the mandrel such as roller 56 shown on section 50c.

With reference now directed particularly to FIG. 5 as well as FIG. 3, details of a mandrel support means or structure, generally designated at 58, will be described. A well 60 is provided beneath floor 18 and includes side walls 62 and a bottom 64. Disposed within well 60 is a stand including a platform 66 supported by upright legs 68. Fluid-actuated cylinders 70, 72 are mounted on platform 66 by means of mounting plates 74, 76, respectively. Fluid actuated cylinders 70, 72 are operable to selectively extend and retract associated rods 70a, 72a, respectively. A support beam 78 interconnects rods 70a and 72a and includes a bend to accommodate the curvature of mandrel 50. The operation of cylinders 70, 72 will be described later. The well also is used to store and collect testing water.

Referring to FIGS. 1 and 2, specifics of apparatus 10 will be described. Longitudinally extending guide rails 13, 15 are mounted on tension beams 12, 14, respectively. To the left of apparatus 10 in FIG. 1 is a second, shiftable sealing means, generally designated at 80. Sealing means 80 includes a box-like frame assembly, designated at 82 having interconnected side plates. Assembly 82 is mounted on wheels 86 for movement along rails 13, 15. Carriage 84 extends rearwardly from assembly 82 and also includes wheels 86 adapted to mount carriage 84 on rails 13, 15. A drive motor 88, such as hydraulic unit, is mounted on carriage 84 and is operable to selectively shift assembly 82 to the left or right as shown in FIG. 1. A hydraulic fluid tank is indicated at 90 and chocks at 91.

Frame assembly 82 is constructed with openings or channels adjacent its top and bottom to accommodate insertion therethrough of the tension beam members. For instance, as shown in FIG. 6, openings 82a and 82b are sized to accommodate tension beams 12, 14, respectively along with their associated rails. Similarly, openings (not shown) are provided adjacent to the top of assembly 82 to permit extension therethrough of tension beam members 32, 34.

Further considering FIGS. 1 and 2, it can be seen that assembly 82 includes a front plate 86 having guide rollers, one of which is shown at 88, suitably mounted thereon. Guide roller 88 contacts a bottom surface of tension beam 32 while another guide roller, (not shown) is mounted on plate 86 to contact the bottom of tension beam 34. Adjusting means, such as a plurality of fluid-actuated cylinders are also mounted on plate 86. As an example, a cylinder 92 is secured to plate 86 by a mount 94. An extendible-retractable cylinder rod 96 has a foot 98 secured at one end thereof, which foot is secured to a vertically disposed pressure plate 100. Thus, it can seen that pressure plate 100 may be selectively adjusted relative to assembly 82 in a horizontal direction. Connected at the bottom of pressure plate 100 are additional guide rollers 107 (only one shown in FIG. 1) for guiding pressure plate 100 along rails 13, 15.

Further considering pressure plate 100, it can be seen that a cylindrical member or plug means 102 is secured to extend therefrom. Plug means 102 is dimensioned so that it may be coaxially inserted within the open end of mandrel 50. Plug means 102 further includes a tapered end 103 for facilitating insertion into mandrel 50 past a seal 51 in seal section 50d.

While assembly 82 has been described as being shiftable along rails 13, 15, it is to be further noted that locking means are provided to lock assembly 82 to upper and lower tension beam members 12, 14 and 32, 34. For instance, as shown in FIGS. 6 and 7, a locking means 104 is provided at a bottom of assembly 82 intermediate tension beams 12, 14. A similar locking means 105 is provided adjacent to the top of assembly 82 (see FIG. 2). Because the locking means are substantially identical, only locking means 104 will be described in detail. A bracket 106 is secured to and extends rearwardly from a rear plate 83 of assembly 82. Connected to an end and a bottom of bracket 106, respectively, are plates 108, 110. Mounted to plate 106 on opposite sides thereof are fluid actuated cylinders 112, 114. For instance, cylinder 112 is mounted to the right-hand side of bracket 106 by means of a mounting plate 107.

Similarly, cylinder 114 is mounted to the left-hand side of bracket 106. An aperture 106a is provided in bracket 106 so that a rod 113 associated with cylinder 112 may be extended therethrough. Cylinder 114 also includes an actuatable rod 115 which is inserted through an aperture 106b in bracket 106. Considering rod 115, it can be seen that the rod has a clevis 116 which is connected by means of a pin 117 to a link 118. Link 118 is connected to a key member 120. A plate 122 is provided for additional support for the connection between link 118 and key member 120. Similarly, key member 124 is connected to rod 113.

As shown in FIGS. 6 and 7, cylinders 112, 114 have been actuated to extend their associated rods 113, 115 outwardly. Thus, it can be seen that key members 120, 124 are inserted through slots 12a, 14a, in tension beam members, 12, 14, respectively. It can be appreciated that shiftable frame assembly 82 will be securely locked to the tension beam members. When rods 113, 115 are retracted, key members 120, 124 are withdrawn from the slots thus permitting shifting of assembly 82.

With reference now redirected to FIG. 1, it can be further seen that a plurality of carts 126, 128, etc., are joined together to form a movable assembly provided with appropriate rollers or wheels 130 for movement longitudinally down rails 13, 15. A pipe P, to be tested, is suitably supported upon the movable carts. The carts may be selectively added or withdrawn, depending upon the length of a pipe to be tested.

Considering FIGS. 3 and 10, additional details pertaining to the introduction of fluid into the testing apparatus will be described. After mandrel 50 has been inserted within a pipe in a testing position, it is necessary to introduce a fluid, such as water, between the mandrel and the interior diameter of the pipe. As shown to the right in FIG. 3, and particularly in FIG. 10, a pipe 132 extends through fixed frame assembly 20 and communicates with an aperture 52a provided in sealing plate 52. Extending from plate 52 is a conduit 134 which branches into conduits 136, 138. Conduits 136, 138 extend outwardly through side portions of mandrel 50. Thus, it can be seen that water under pressure may be pumped through inlet 132 from a source (not shown) through conduits 136, 138 into an annular chamber formed between the outer diameter of mandrel 50 and the inner diameter of a pipe to be tested. Water may also be withdrawn through pipe 132 after testing has been completed. Not shown, is an air venting conduit which vents air from the annular chamber during filling with water.

The operation of pipe testing apparatus 10 will now be described with reference to pipe P shown in FIGS. 1 and 2. Initially, assembly 82 is disposed at the left-hand side of the apparatus as shown in FIG. 1. Depending upon the length of a pipe to be tested, mandrel 50 is assembled with mandrel sections which would provide an overall axial dimension slightly less than the overall axial dimension of pipe P. As an example, mandrel 50, as shown in FIG. 3, includes sections 50a, 50b, 50c and a seal section 50d.

Test pipe P is then loaded onto carts 126, 128 sufficient to support it along its length. Cylinders 92 are actuated so that their associated rods 96 are retracted. Locking means 104, 105 are also disposed with their respective key members retracted. Motor 88 is actuated to shift assembly 82 to the right as shown in FIG. 1 so that plug means 103 is inserted within the left-hand end of pipe P until pressure 100 contacts the end. Assembly 82 is then continuously advanced to the right until seal section 50d is inserted within pipe P. Assembly 82 continues to advance pipe P over mandrel 50 until roller 56 on mandrel section 50c contacts an interior surface of pipe P. Roller 56 facilitates movement of mandrel 50 through pipe P. At this point, it is necessary to actuate mandrel support structure 58 so that rods 70a, 72a are retracted within their respective cylinders 70, 72. Retraction is required to the extent that support beam 78 must not interfere with the movement of the carts or pipe P as the pipe is further advanced over the mandrel. As pipe P is continuously advanced, additional rollers 56 contact an inside pipe surface and the other mandrel support structures 58 are retracted.

Assembly 82 is then advanced slightly ahead of predetermined slots 12a and 32a to a position in which the longitudinal axis of the key members is aligned with the center of the slots. With reference to FIG. 8, which figure is a greatly reduced lengthwise view, it can be seen that pipe P has been positioned so that it's right-hand end is adjacent to the plate 52. At this point, the locking means 104, 105 are actuated so that their respective key members are inserted through associated slots. Assembly 82 is thereby locked to tension beam members 12, 14, 32, 34.

For a final sealing adjustment, cylinders 92 are actuated. As shown in FIG. 9, cylinders 92 are actuated to extend rods 96 to the right so that plug means 102 is inserted within seal section 50d of mandrel 50. A seal means 51 is provided within seal section 50d to contact an outer surface of plug means 102 to provide a seal therebetween. The right hand end of pipe P is simultaneously urged against plate 52. Plate 52 is also urged against plate 32 and the mandrel is now totally inserted within the pipe in a testing position. As long as pressure is maintained to urge pressure plate 100 against the left-hand end of pipe P as shown in FIG. 9, both ends of pipe P and mandrel 50 will be fluid-sealed. A gasket (not shown) may be interposed between the end of the pipe and plate 100.

Thus, in the testing position shown in FIG. 9, frame assembly 82 is locked to the tension beam members and pressure plate 100 seals the left-hand end of pipe P while simultaneously sealing the left-hand end of mandrel 50 and sealing the right-hand end of pipe P. Fluid under pressure may then be introduced through inlet 132 and outwardly through conduits 136, 138 into the annular chamber surrounding the outside of the mandrel and the interior of pipe P. Pipe P may then be tested for leakage and structural integrity under pressure of the fluid.

During such testing, it can be seen that substantial forces will be developed in the annular chamber between mandrel 50 and pipe P which forces will be translated in a longitudinal direction against pressure plate 100 and plate 52. Because assemblies 20 and 82 are fixed to tension beam members 12, 14, 32, and 34 in the testing position, the longitudinal forces will be transmitted through the frame assemblies to the tension beam members. Thus, a structurally sound rigid structure is provided to ensure that the ends of the pipe will be continuously sealed when the pipe is undergoing testing.

Other advantages of the present invention should be readily apparent. For instance, within certain limits, testing apparatus 10 is not dependent upon pipe diameter. Both sealing plate 52 and pressure plate 100 are sized to accommodate pipes of widely varying diameters. For example, diameters upwardly of 90 inches may be accommodated. Furthermore, because of the provision of plug means 102, an external seal around mandrel 50 is not required to seal an end of the mandrel with respect to the end of a pipe being tested. Thus, complex and expensive mandrel seals are eliminated.

A further advantage of the present invention is the ready adaptability of mandrel 50 for insertion into long lengths of pipe. The detachable mandrel sections may be readily interconnected or disconnected depending upon the length of a pipe to be tested. Using the apparatus of the present invention, long lengths of pipe have been successfully tested.

Additionally, it is to be noted that mandrel support structures 58 provide a simple and effective method for horizontally supporting mandrel 50 while also being operable for retraction to permit a test pipe to be inserted over the mandrel. The support structures ensure that the mandrel and the plug means will be maintained substantially coaxially aligned relative to one another.

It is claimed and desired to secure by letters patent:

1. Apparatus for testing a pipe under internal fluid pressure comprising an elongate, hollow mandrel movable relatively into one end of the pipe to a testing position therewithin;

first sealing means for producing a fluid-sealed condition between one end of said mandrel and said pipe end;

second sealing means shiftable in a coaxial direction relative to said mandrel for producing a fluid-sealed condition between the other end of said mandrel and the opposite end of the pipe when said mandrel is disposed in the testing position, said second sealing means including a pressure plate and a plug means extending therefrom, said pressure plate being positionable against the opposite end of the pipe and said plug means being insertable within the other end of said mandrel; and means for introducing fluid under pressure between said mandrel and the pipe.

2. The apparatus of claim 1, wherein laterally opposed beam members are arranged to extend alongside said mandrel parallel to the mandrel's longitudinal axis, said beam members adapted to permit said second sealing means to be shifted therealong.

3. The apparatus of claim 2, wherein cart means is mounted on said beam members for supporting a pipe, said cart means being movable along said beam members to permit said mandrel to be inserted within the pipe.

4. The apparatus of claim 3, wherein said second sealing means further includes a frame assembly which is mounted on said beam members and is shiftable therealong, said pressure plate being connected to said frame assembly.

5. The apparatus of claim 4, wherein said frame assembly is provided with locking means operable for selectively locking said frame assembly to said beam members at predetermined locations along said beam members.

6. The apparatus of claim 5, wherein said beam members include spaced-apart slots formed thereon, said slots extending at least partially through the width of an associated beam member, said locking means including means operable for selectively extending and retracting key means into and from selected slots.

7. Apparatus for testing a pipe under internal fluid pressure comprising a horizontally disposed elongate, hollow mandrel movable relatively into one end of the pipe to a testing position therewith;

laterally opposed lower beam members mounted on a floor surface and disposed beneath said mandrel, said beam members extending alongside said mandrel parallel to the mandrel's longitudinal axis;

first sealing means supported adjacent a fixed assembly which is secured to said beam members, said sealing means being arranged for producing a fluid sealed condition between one end of said mandrel and said pipe end;

second sealing means shiftable in a coaxial direction relative to said mandrel along said lower beam members for advancing the pipe over said mandrel and for producing a sealed condition between the other end of said mandrel and the opposite end of the pipe when said mandrel is disposed in the testing position;

support means for supporting said mandrel above said lower beam members, said support means being retractable for permitting insertion of said mandrel into the pipe; and means for introducing fluid under pressure between said mandrel and the pipe.

8. The apparatus of claim 7, wherein said mandrel includes a plurality of mandrel sections adapted to be detachably connected to extend in an axial direction for permitting the mandrel's lengthwise dimension to be selectively increased or decreased.

9. The apparatus of claim 8, wherein said mandrel includes roller means for engaging the inside surface of the pipe during insertion of said mandrel therewithin.

10. The apparatus of claim 7, wherein upper beam members are disposed above said lower beam members and are secured adjacent one set of their ends to said fixed assembly, the upper beam members being rigidly mounted on said floor surface by means of a support structure.

11. The apparatus of claim 10, wherein said second sealing means includes a frame assembly, said frame assembly being mounted on said lower beam members and shiftable there-along.

12. The apparatus of claim 11, wherein said upper and lower beam members are provided with slots at selected locations along their length, said slots extending at least partially through a beam member's width, said frame assembly including locking means and key means, said locking means being operable for selectively extending and retracting said key means into and from selected slots.

13. The apparatus of claim 7, wherein said second sealing means includes a pressure plate connected to a frame assembly, said frame assembly being mounted on said lower beam members and shiftable therealong.

14. The apparatus of claim 13, wherein said pressure plate includes a member extending therefrom, said pressure plate being adapted to seal the opposite end of the pipe and said member being adapted to seal the other end of said mandrel when said mandrel is disposed in said testing position.

15. The apparatus of claim 14, wherein said member includes a plug means at least partially insertable within the other end of the mandrel when said mandrel is in said testing position, said mandrel including sealing means for engaging said plug means.

16. The apparatus of claim 15, wherein adjusting means are provided on said frame assembly operable for selectively extending and retracting said pressure plate relative to said frame assembly in a direction coaxially with respect to said mandrel.

17. The apparatus of claim 15, wherein said plug means is cylindrical and is provided with a tapered end for facilitating insertion into said mandrel.

* * * * *

UNITED STATES PATENT AND TRADEMARK OFFICE
CERTIFICATE OF CORRECTION

PATENT NO. : 4,067,228
DATED : January 10, 1978
INVENTOR(S) : Ralph C. Elle; Jerry L. Walker It is certified that error appears in the above-identified patent and that said Letters Patent are hereby corrected as shown below:

Column 2, line 43, delete "INVENTION" and substitute therefor --PREFERRED EMBODIMENT--;

Column 2, line 56, after "is" insert --a--;

Column 3, line 26, before "section" insert --seal--;

Column 3, line 59, after "as" insert --a--;

Column 5, line 45, after "pressure" insert --plate--;

Column 7, line 49, delete "therewith" and substitute therefor --therewithin--;

Signed and Sealed this

Nineteenth Day of September 1978

[SEAL]

Attest:

RUTH C. MASON
*Attesting Officer*

DONALD W. BANNER
*Commissioner of Patents and Trademarks*